3,660,469
BIS-TRIIODOISOPHTHALAMIC ACID COMPOUNDS

Jack Bernstein and Kathryn A. Losee, New Brunswick, N.J., assignors to E. R. Squibb & Sons, Inc., New York, N.Y.
No Drawing. Filed Aug. 4, 1969, Ser. No. 847,449
Int. Cl. C07c *103/24*
U.S. Cl. 260—501.11                9 Claims

ABSTRACT OF THE DISCLOSURE

This invention relates to new bis-triiodoisophthalamic acid compounds having the formula

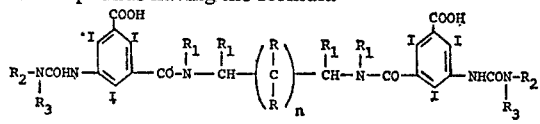

and to salts and lower alkyl esters of these compounds. These compounds are useful as radiopaque agents.

SUMMARY OF THE INVENTION

This invention relates to new compounds of the Formula I (I)

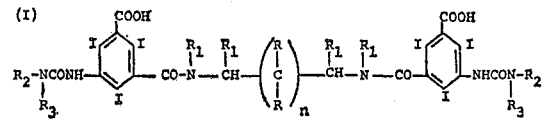

and to basic salts of these compounds, e.g. alkali metal salts such as, for example, sodium and potassium, alkaline earth salts such as, for example, calcium, ammonium salts and amine salts such as, for example N-methylglucamine, as well as lower aliphatic esters, such as the methyl, ethyl, butyl and hexyl esters.

In Formula I, R represents hydrogen, lower alkyl radical or lower alkoxy radical, $R_1$ represents hydrogen or lower alkyl radical, $R_2$ represents an alkyl radical of up to 6 carbon atoms, phenyl or phenyl substituted by lower alkyl, lower alkoxy or halogen, or an aralkyl radical of up to 8 carbon atoms, such as, for example, benzyl or phenethyl, $R_3$ represents hydrogen or an alkyl radical of up to 6 carbon atoms and $n$ is an integer from 0 to 5.

The alkylene chain between the two rings

may be straight or branched saturated hydrocarbon chains of 2 to 7 carbon atoms. Up to three hydrogen atoms of the alkylene chain may be substituted by lower alkoxy groups. Such lower alkoxy groups as methoxy, ethoxy, propoxy, i-propoxy, i-butoxy and the like are illustrative.

As used in this specification, the terms "lower alkyl" and "lower alkoxy" radicals include straight and branched chain saturated radicals up to four carbon atoms.

Preferred are those compounds of Formula I in which the bridging alkylene chain is an unsubstituted hydrocarbon chain of 2 to 3 carbon atoms, especially the latter, and in which $R_1$ and $R_3$ are hydrogen and $R_2$ is methyl, and the sodium and N-methylglucamine salts thereof.

The new compounds of this invention are produced by reacting a compound of the Formula II (II)

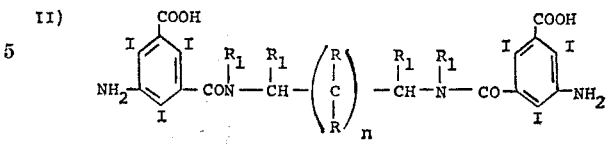

with a compound of the Formula III or IV

III                IV wherein $R_2$ and $R_3$ are as hereinbefore defined and X is halogen, preferably chlorine.

The compounds of Formula II can be prepared as disclosed in U.S. patent application Ser. No. 649,831, filed June 29, 1967 now U.S. Pat. No. 3,541,141.

Suitable compounds of Formula III include aliphatic isocyanates such as methyl isocyanate, ethyl isocyanate and hexyl isocyanate; aromatic isocyanates such as phenyl isocyanate and p-chlorophenyl isocyanate; and aralkyl isocyanates such as benzyl isocyanate.

Suitable compounds of Formula IV include dimethylcarbamoyl chloride, diethylcarbamoyl chloride, and dibutylcarbamoyl chloride.

The reaction between a compound of Formula II and a compound of Formula III is carried out in an inert solvent such as dimethylformamide, dimethylacetamide, ethylene glycol dimethyl ether, diethylene glycol dimethyl ether and the like preferably at elevated temperatures below the boiling point of the solvent. The product is recovered by removal of the solvent by distillation and addition of water to the residue. Alternatively, the reaction mixture may be diluted with water and the product recovered by filtration.

The reaction between a compound of Formula II and a compound of Formula IV is carried out in an inert solvent as indicated above in the presence of a hydrogen chloride acceptor such as pyridine, N-methylmorpholine, triethylamine and the like, and the product obtained as indicated above.

To prepare salts of the compounds of Formula I, the compounds are reacted with an inorganic or organic base, e.g. alkali metal hydroxide such as sodium hydroxide or amines, such as N-methylglucamine. The esters may be formed by treating an alkaline solution of a compound of Formula I with a di(lower alkyl) sulfate, such as dimethyl sulfate or by treatment with a diazoalkane such as diazomethane. The salts, especially insoluble salts, frequently provide a convenient means of isolating and purifying the product.

The new products of Formula I are useful as radiopaque agents for visualization of animal systems or organs, preferably in the form of physiologically acceptable salts such as sodium or methylglucamine salts for the preparation of solutions for intravascular injection for urography and for vasographic techniques such as angiocardiography, arteriography, nephrography and venography. The water-insoluble esters are useful in visualizing hollow organs and cavities having external orifices through which the contrast preparation can be introduced in preparation for the examination and removal after the examination is completed. Solutions having about 20 to 50% bound iodine, preferably about 37%, may be used, or on a weight basis from about 20 g. to about 75 g. of a compound of Formula I per 100 ml. of water.

The following examples illustrate the present invention without, however, limiting the same thereto. All temperatures are on the centigrade scale.

EXAMPLE 1

To a solution of 5.5 grams of N,N'-trimethylenebis(5-amino-2,4,6-triiodoisophthalamic acid) in 50 ml. of dimethylformamide, there is added 2 grams of methyl isocyanate and the reaction mixture is heated on a steam bath for six hours. The dimethylformamide is removed by distillation under reduced pressure and the residue triturated with water, to which dilute hydrochloric acid has been added. The precipitated solid is filtered, washed with dilute hydrochloric acid and allowed to air dry to yield the desired N,N'-trimethylenebis[5-(3-methylureido)-2,4,6-triiodoisophthalamic acid] as a white solid. The product may be purified by solution in dilute sodium hydroxide, filtering to remove any insoluble material and precipitating the desired product with dilute hydrochloric acid.

EXAMPLE 2

Following the procedure of Example 1, but substituting an equivalent amount of N,N'-ethylenebis(5-amino-2,4,6-triiodoisophthalamic acid) for the N,N'-trimethylenebis-(5-amino-2,4,6-triiodoisophthalamic acid) there is obtained the desired N,N'-ethylenebis[5-(3-methyluredio)-2,4,6-triiodoisophthalamic acid].

EXAMPLE 3

Following the procedure of Example 1, but substituting an equivalent amount of n-butyl isocyanate for the methyl isocyanate, there is obtained the desired N,N'-trimethylenebis[5-(3-n - butylureido) - 2,4,6 - triiodoisophthalamic acid].

EXAMPLE 4

Following the procedure of Example 1, but substituting an equivalent amount of n-hexyl isocyanate for the methyl isocyanate, there is obtained the desired N,N'-trimethylenebis[5 - (3 - n - hexylureido) - 2,4,6-triiodoisophthalamic acid].

EXAMPLE 5

Following the procedure of Example 1, but substituting an equivalent amount of N,N'-(2,3-dimethoxytetramethylene)bis(5-amino-2,4,6-triiodoisophthalamic acid) for the N,N'-trimethylenebis(5-amino-2,4,6 - triiodoisophthalamic acid), there is obtained the desired N,N'-(2,3-dimethoxytetramethylene)bis[5-(3-methylureoido)-2,4,6 - triiodoisophthalamic acid].

EXAMPLE 6

Following the procedure of Example 1, but substituting an equivalent amount of N,N'-(2,2-dimethyltrimethylene)bis(5-amino-2,4,6-triiodoisophthalamic acid) for the N,N'-trimethylenebis(5-amino-2,4,6-triiodoisophthalamic acid), there is obtained the desired N,N'-(2,2-dimethyltrimethylene)bis[5-(3-methylureido)-2,4,6 - triiodoisophthalamic acid].

EXAMPLE 7

Following the procedure of Example 1 but substituting an equivalent amount of phenyl isocyanate for the methyl isocyanate, there is obtained the desired N,N'-trimethylenebis[5-(3 - phenylureido) - 2,4,6 - triiodoisophthalamic acid].

EXAMPLE 8

Following the procedure of Example 1, but substituting an equivalent, amount of benzyl isocyanate for the methyl isocyanate, there is obtained the desired N,N'-trimethylenebis[5 - (3 - benzylureido) - 2,4,6 - triiodoisophthalamic acid].

EXAMPLE 9

To a solution of 5.5 grams of N,N'-trimethylenebis(5-amino-2,4,6-triiodoisophthalamic acid in 50 ml. of dimethylformamide there is added 5 ml. of N-methylmorpholine. The mixture is vigorously stirred and 1.28 grams of dimethylcarbamoyl chloride added dropwise. The reaction mixture is stirred for one hour and is then warmed on a steam bath for five hours. The dimethylformamide is removed by distillation under reduced pressure and the residue added to 100 ml. of 10% hydrochloric acid. The precipitated solid is filtered, dissolved in 10% sodium hydroxide, filtered and reprecipitated with dilute hydrochloric acid to yield the desired N,N'-trimethylenebis[5-(3,3-dimethylureido)-2,4,6-triiodoisophthalamic acid].

EXAMPLE 10

Following the procedure of Example 9, but substituting an equivalent amount of dibutylcarbamoyl chloride for the dimethylcarbamoyl chloride, there is obtained the desired N,N' - trimethylenebis[5 - (3,3 - dibutylureido) - 2,4,6-triiodoisophthalamic acid].

EXAMPLE 11

To a solution of 3 grams of N,N'-trimethylenebis[5-(3-methylureido)-2,4,6-triiodoisophthalamic acid] in 50 ml. of dimethylformamide there is added slowly, with vigorous stirring, an excess of a solution of diazomethane in ether. The mixture is stirred for two hours, a few drops of acetic acid are added to destroy the excess diazomethane and the solvents removed by concentration under reduced pressure. The residue is suspended in dilute sodium hydroxide and the insoluble dimethyl ester of N,N'-trimethylenebis [5-(3-methylureido)-2,4,6-triiodoisophthalamic acid] recovered by filtration.

EXAMPLE 12

To a suspension of 127 grams of N,N'-trimethylenebis-[5-(3-methylureido)-2,4,6-triiodoisophthalamic acid] in 1 liter of water there is added 200 ml. of N-NaOH solution and the resulting solution lyophilized to yield the desired disodium salt of N,N'-trimethylenebis[5-(3-methylureido)-2,4,6-triiodoisophthalamic acid].

Similarly, by using an equivalent amount of N-methylglucamine there is obtained the desired N-methylglucamine salt of N,N'-trimethylenebis[5-(3-methylureido)-2,4,6-triiodoisophthalamic acid].

EXAMPLE 13

A solution suitable for use in intravenous urography has the following composition (per 100 ml.):

N,N' - trimethylenebis[5 - (3 - methyluredio) - 2,4,6-triiodoisophthalamic acid] sodium salt: 65.7 grams
Sodium critrate (as buffer): 320 mg.
Disodium ethylenediaminetetracetic acid dihydrate (sequestering agent): 40 mg.
Methylparaben (as preservative): 100 mg.
Propylparaben (as preservative): 30 mg.

The solution is prespared by dissolving the sodium salt in a limited amount of sterile water, adjusting the pH to about 7, adding the rest of the components and adjusting the final volume to 100 ml.

What is claimed is:

1. A compound of the formula $$R_2\text{-NCOHN}\underset{R_3}{\overset{}{|}}\text{-}\underset{I}{\overset{COOH}{\underset{I}{\bigcirc}}}\text{-}CO\text{-}N\text{-}\underset{R_1}{\overset{R_1}{|}}CH\text{-}\left(\underset{R}{\overset{}{C}}\right)_n\text{-}CH\text{-}N\text{-}CO\text{-}\underset{I}{\overset{COOH}{\underset{I}{\bigcirc}}}\text{-}NHCON\text{-}R_2\underset{R_3}{\overset{}{|}}$$

wherein $n$ is an integer form 0 to 5, R is hydrogen, a lower alkyl radical or a lower alkoxy radical of up to four carbon atoms, $R_1$ is hydrogen or a lower alkyl radical of up to four carbon atoms, $R_2$ is an alkyl radical of up to six carbon atoms, phenyl or benzyl or phenethyl radical, and $R_3$ is hydrogen or an alkyl radical of up to six carbon atoms, and lower alkanoic acid esters of up to six carbon atoms and alkali metal, alkaline earth metal, ammonium and amine salts thereof, not more than three alkoxy groups being present in the molecule.

2. A sodium salt of a compound of claim 1.

3. An N-methylglucamine salt of a compound of claim 1.

4. A compound of claim 1 wherein $n$ is 0 or 1.

5. A compound of claim 1 wherein $n$ is 1.

6. A compound of claim 2 wherein each R and $R_1$ is hydrogen.

7. A compound of claim 3, wherein each R, $R_1$ and $R_3$ is hydrogen and $R_2$ is methyl.

8. A sodium salt of a compound of claim 4.

9. An N-methylglucamine salt of a compound of claim 7.

References Cited

UNITED STATES PATENTS 3,178,473   4/1965   Holtermann et al. __260—518 A

LORRAINE A. WEINBERGER, Primary Examiner

L. A. THAXTON, Assistant Examiner

U.S. Cl. X.R.

260—471 R, 518 A, 519; 424—5